J. W. DWIGGINS.
MACHINE FOR MAKING WIRE FABRIC.
APPLICATION FILED DEC. 8, 1915.
1,192,766.
Patented July 25, 1916.
9 SHEETS—SHEET 5.
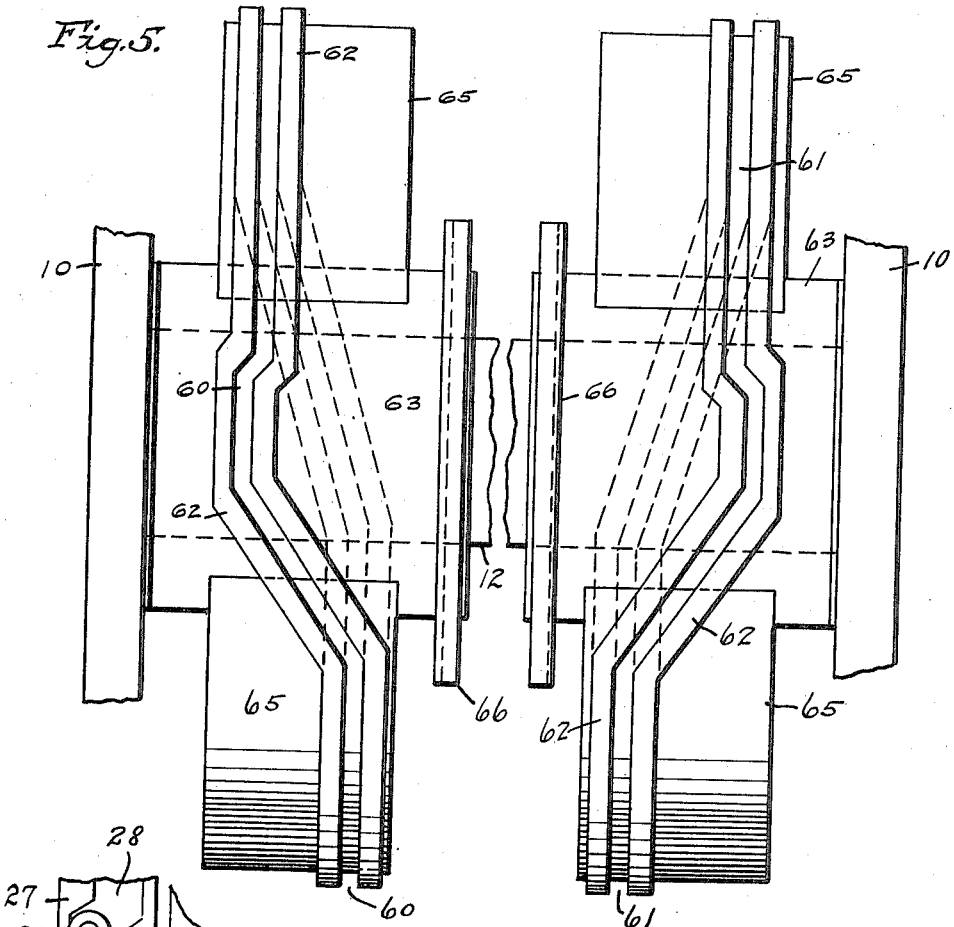
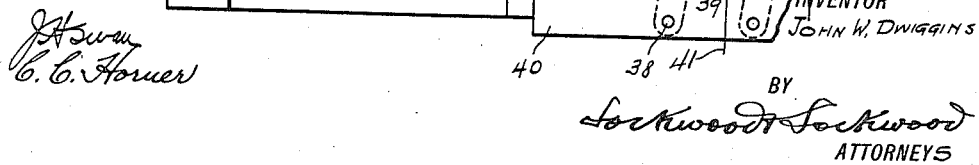
WITNESSES:
INVENTOR
JOHN W. DWIGGINS
BY
Lockwood & Lockwood
ATTORNEYS

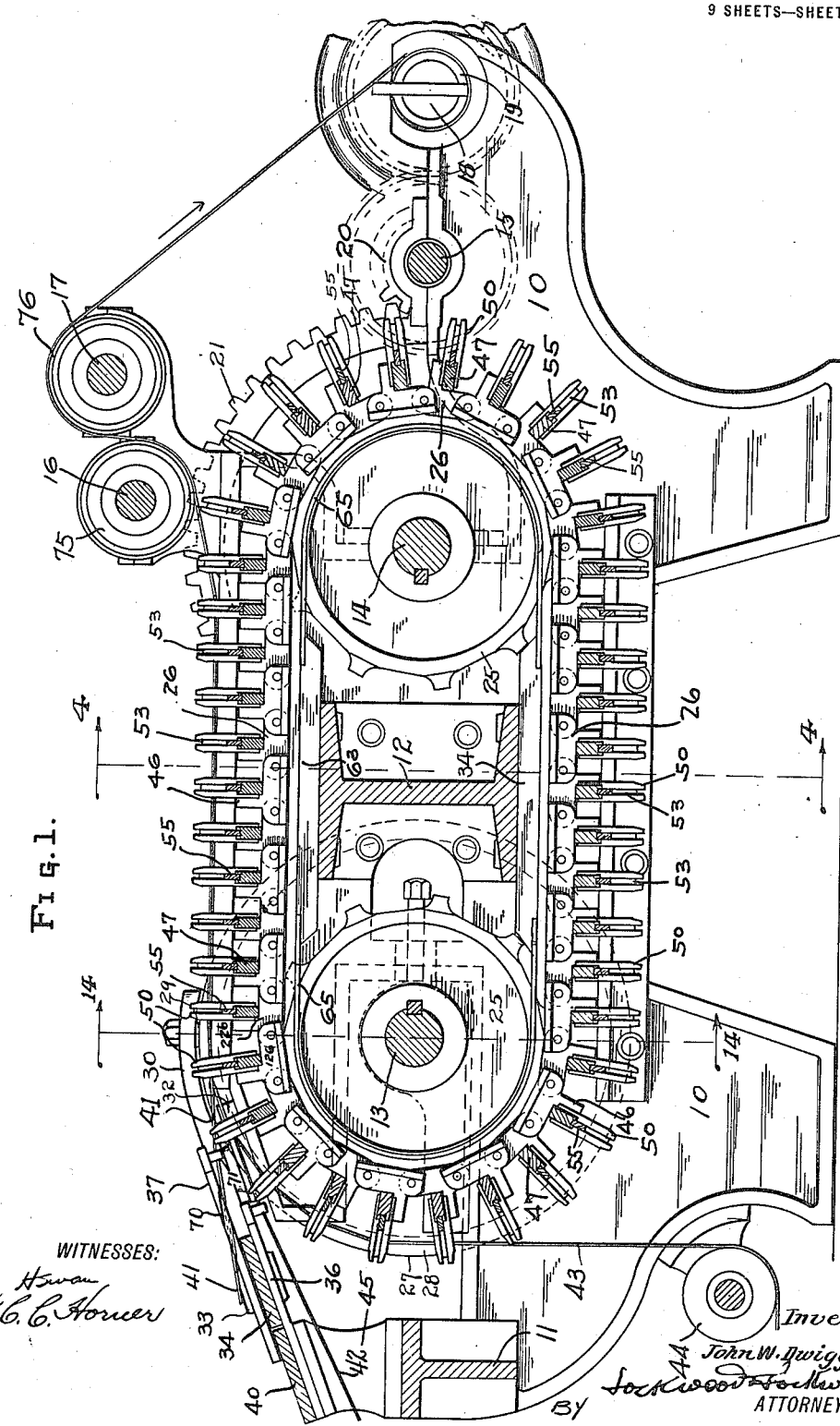

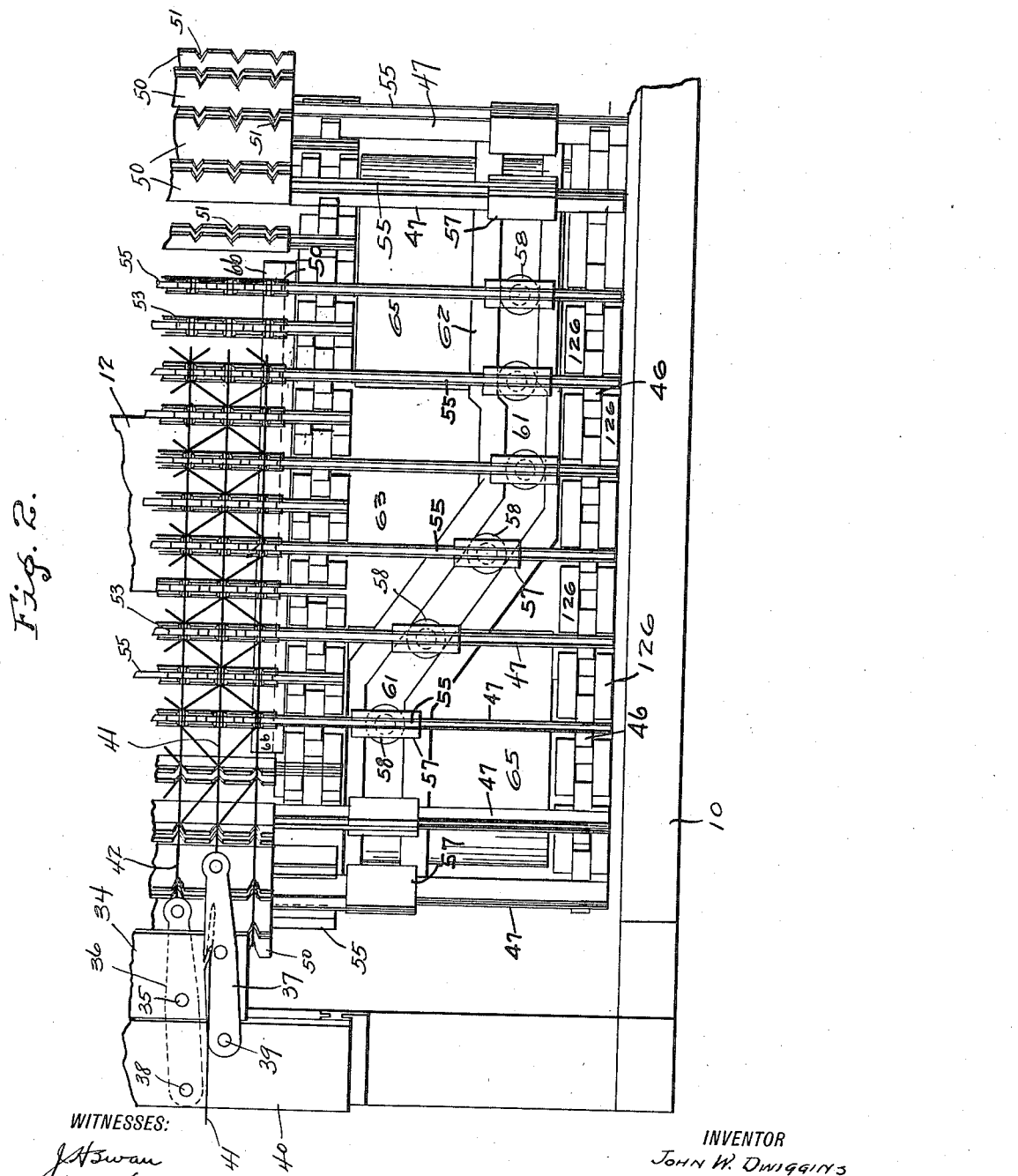

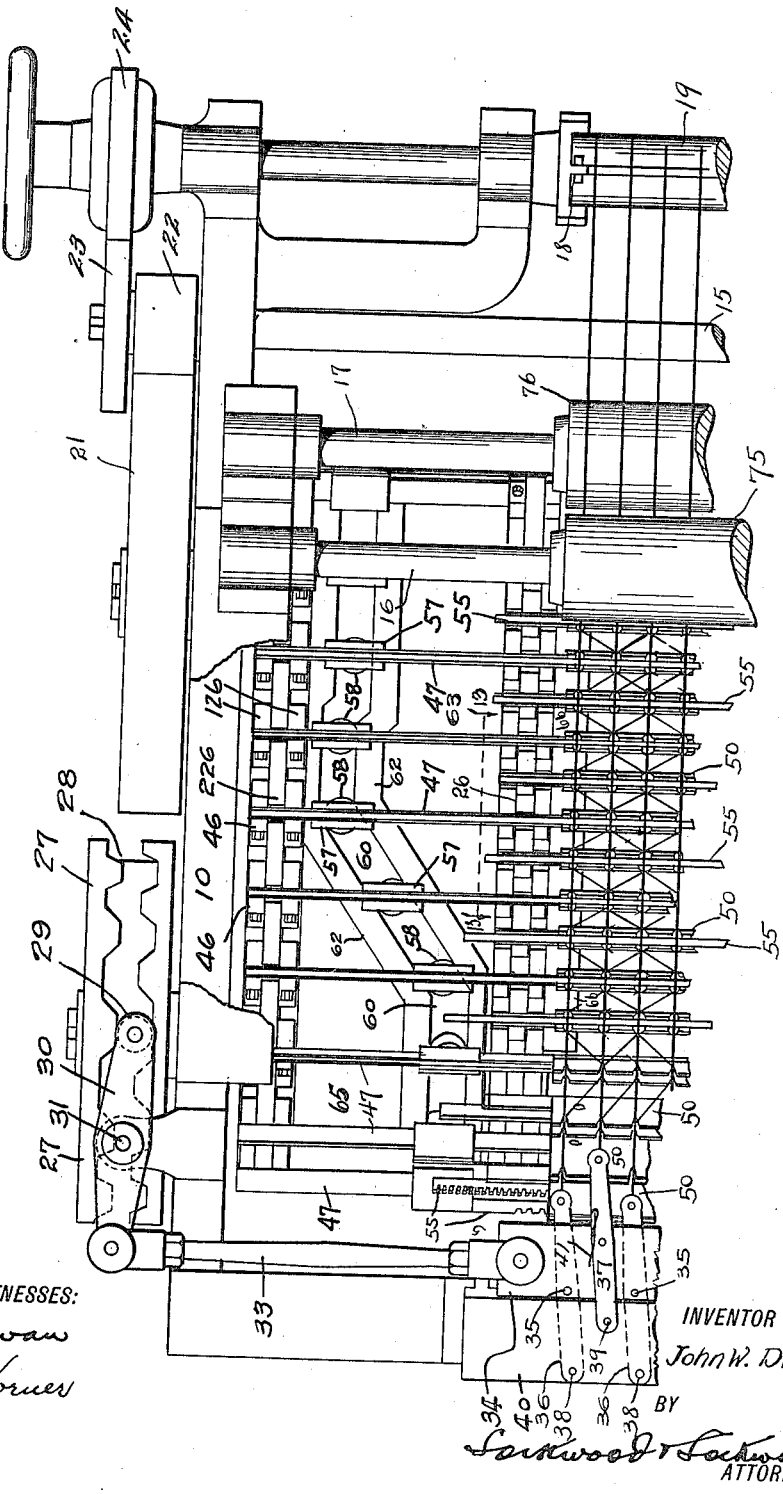

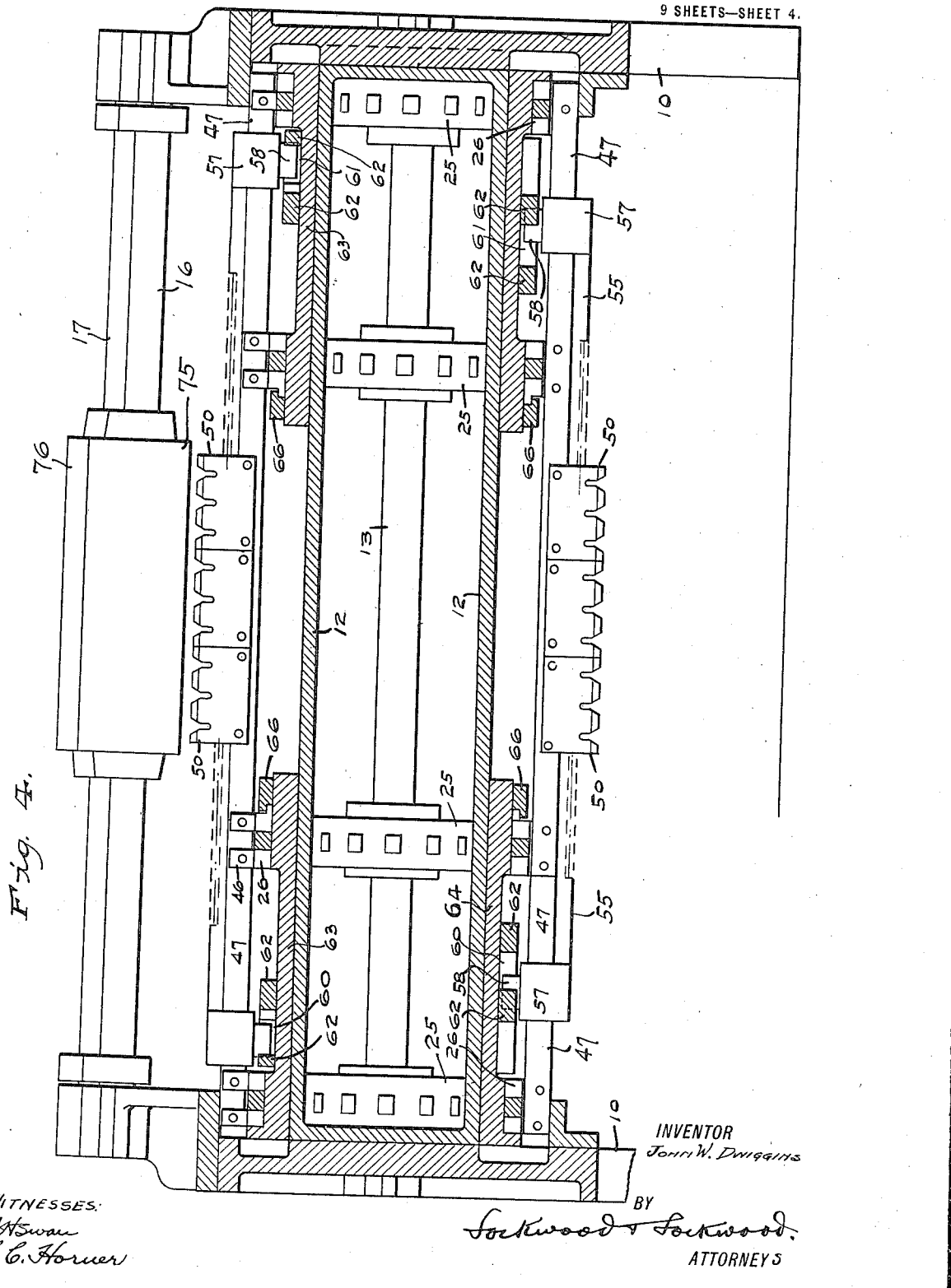

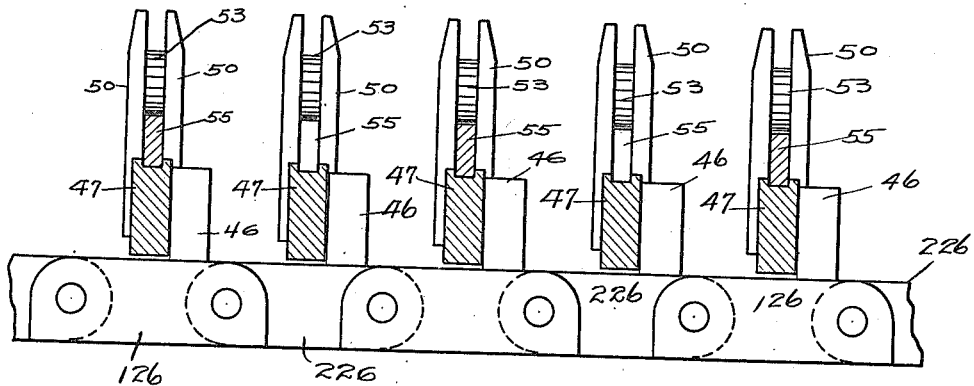
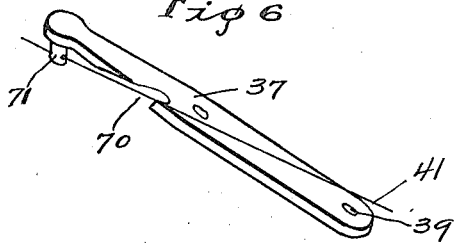

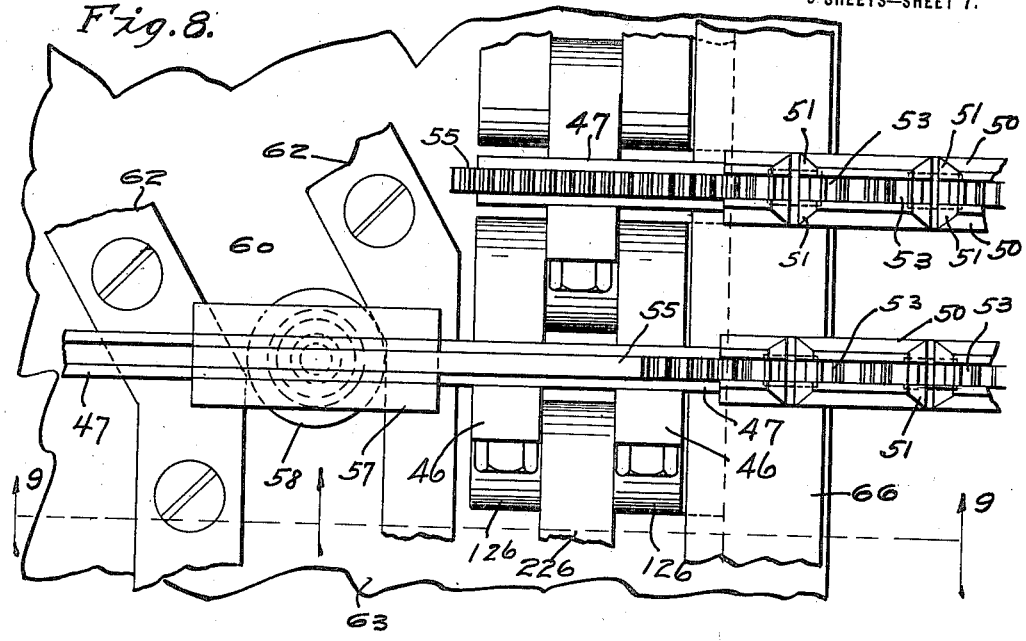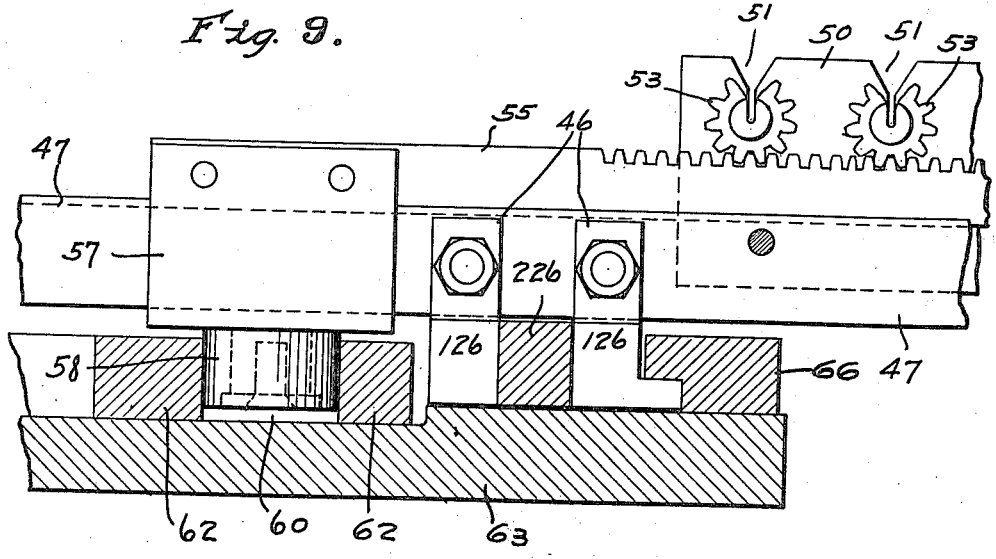

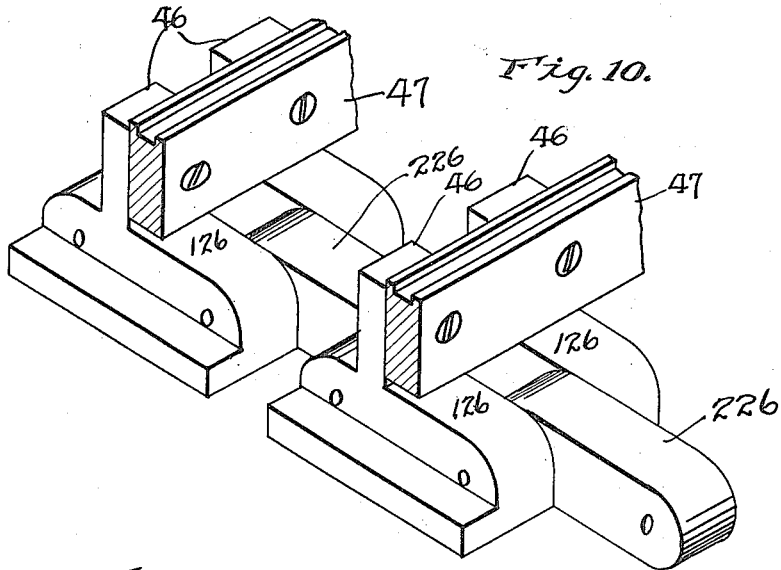
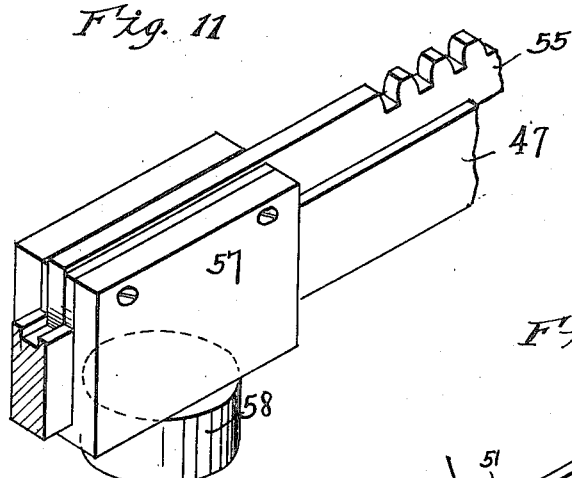
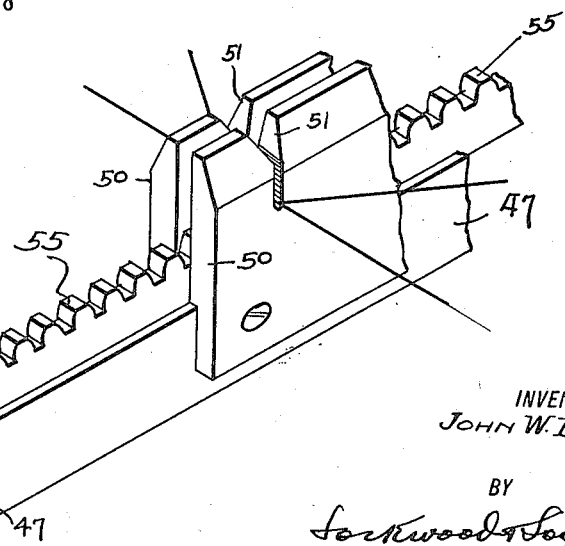

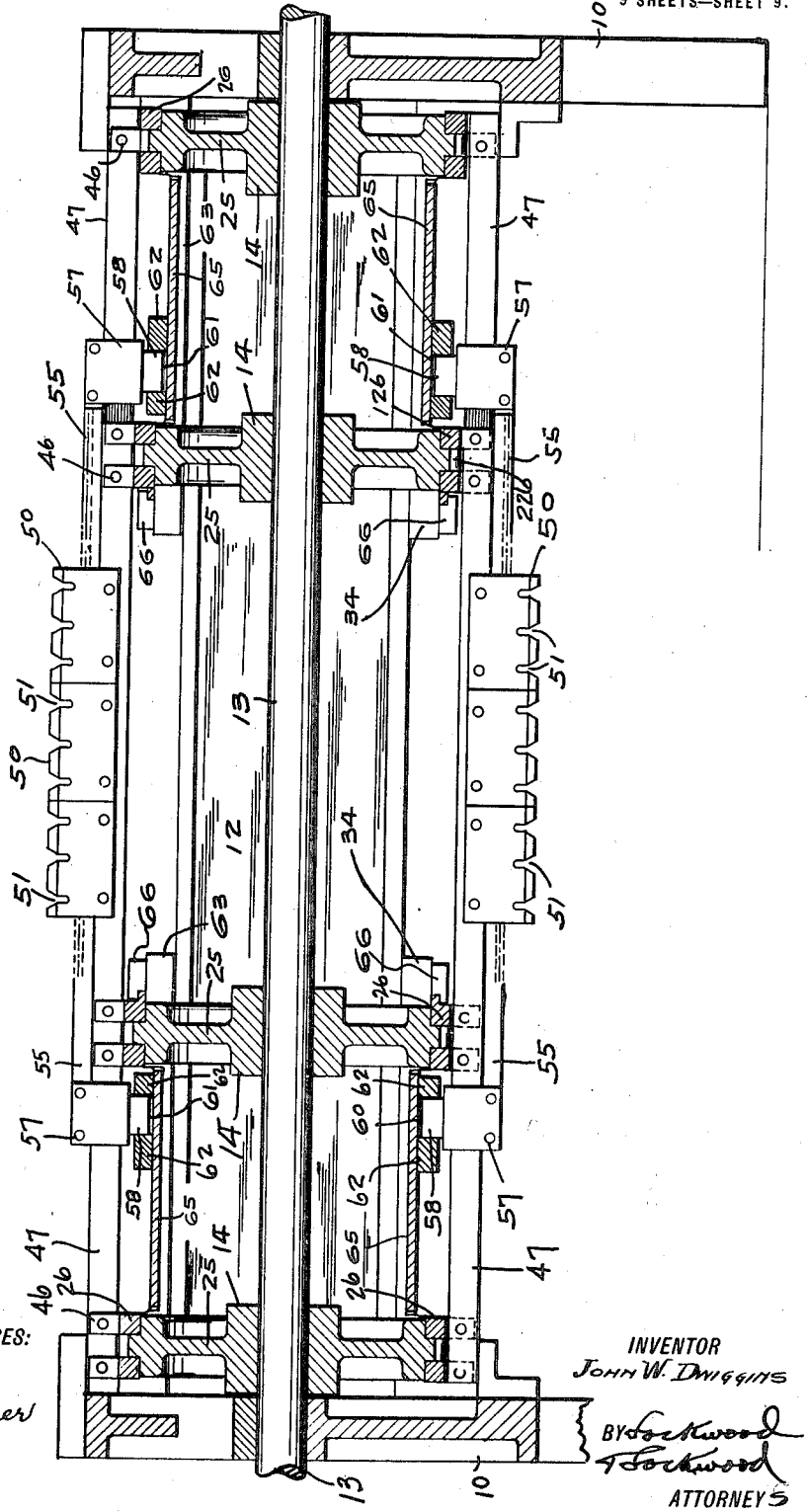

UNITED STATES PATENT OFFICE.

JOHN W. DWIGGINS, OF MARION, INDIANA, ASSIGNOR TO THE PARRISH-ALFORD FENCE & MACHINE COMPANY, OF KNIGHTSTOWN, INDIANA, A CORPORATION.

MACHINE FOR MAKING WIRE FABRIC.

1,192,766.

Specification of Letters Patent.

Patented July 25, 1916.

Application filed December 8, 1915. Serial No. 65,743.

*To all whom it may concern:*

Be it known that I, JOHN W. DWIGGINS, a citizen of the United States, and a resident of Marion, county of Grant, and State of Indiana, have invented a certain new and useful Machine for Making Wire Fabric; and I do hereby declare that the following is a full, clear, and exact description thereof, reference being had to the accompanying drawings, in which like numerals refer to like parts.

This invention relates to machines for weaving or making wire fabric. It was originally designed for the manufacture of wire fencing, particularly of the diamond mesh type; but the invention is not limited to any particular kind of wire fabric or to any particular mesh or style of fabric capable of being made by a series of twisters and means for the lateral transfer of wire from one longitudinal row of twisters to another, whereby the twisters can unite the wires into a fabric.

One feature of the invention consists in mounting the twisters on an endless conveyer or endless chain traveling over two drums, or sets of sprocket-wheels, so that the twisters may travel for some distance horizontally and longitudinally of the mesh. Heretofore twisters have been carried upon single drums, so that the twisters rotated with the drum, and therefore, always moved concentrically with the drum, and never horizontally and longitudinally of the machine. With this construction, during the travel of the twisters horizontally and longitudinally of the machine, ample time is provided for the proper operation of the twisting mechanism and the deliberate completion of the fabric. In the previous form above referred to, the twisting and making of the fabric could only be done while the twisters were passing through a very short arc of their rotary movement.

Another feature of the invention consists in combining with the foregoing feature of the invention, rollers or drums located toward the rear of the machine and above the twister mechanism, over which the woven fabric passes, and arranged to lift the fabric out of the twisting mechanism before the twisters begin to turn downward at the rear end of the machine and while the twisters are traveling horizontally and rearwardly. Therefore the twisters become entirely free of the fabric before they begin to turn downwardly at the rear end of the machine, and hence there is no danger of the twisters catching in the fabric as they begin to turn downward. Heretofore in the single drum machine this has been a serious difficulty, as the twisters had to begin to revolve downward before they were entirely extricated from the fabric.

Another feature of the invention consists in providing rigid plate-like means intermediate the two drums or the like, over which the twister mechanism moves and which supports the upper middle portion of the twister mechanism in absolutely fixed vertical position as said twister mechanism moves rearwardly in a horizontal direction.

Another feature of the invention consists in the means provided for actuating the rack-bars for driving the twisters, which means are guideways in horizontally disposed plates into which roller projections from the rack bars extend, and through which they travel rearwardly on the upper side and forwardly on the lower side of the machine. There are two of these guideways, one near each side of the machine, and having oppositely disposed inclinations, so that one of said guideways operates every other rack-bar and the other guideway operates the remaining rack-bars, and the adjacent rack-bars are moved simultaneously in opposite directions and the mesh wires are twisted laterally in opposite directions by the twisters of adjacent rows.

Another feature of the invention consists in the mounting of the fingers for transferring the mesh wires from one row of twisters to the next and the arrangement for simultaneously shifting them back and forth so that a single means accomplishes the shifting, and the fingers, while of the same length, are so pivoted that one finger places a wire in a twister one row in advance of the twister into which the adjacent finger places a wire. Hence a double capacity is given the machine, that is, the wires are placed in two transverse rows of twisters simultaneously.

In the drawings, Figure 1 is a vertical longitudinal section substantially central of the machine, the machine being partly broken away at the rear. Fig. 2 is a plan view of the right-hand portion of the machine. Fig. 3 is a plan view of the left-hand portion of the machine. Fig. 4 is a transverse section through the machine on the line 4—4 of Fig. 1. Fig. 5 is a plan view of a part of the machine showing the rack-bar actuating means, the remaining parts of the machine being omitted and parts shown by dotted lines. Fig. 6 is a perspective view of one of the upper mesh wire transferring fingers. Fig. 7 shows the left-hand portion of Fig. 3 somewhat enlarged and with the fingers thereof in their other position. Fig. 8 is a plan view of a portion of the machine on a large scale. Fig. 9 is a vertical transverse section through a portion of the machine on a line beside one of the rack-bars. Fig. 10 is a perspective view of a portion of the sprocket-chain and guide-bars secured thereto. Fig. 11 is a perspective view of one end of the rack-bars and projection for reciprocating same and a part of a fixed guide-bar, the latter being shown also in section. Fig. 12 is a perspective view of a portion of a pair of twister holding plates and the rack-bar and guide-bar associated therewith, said bars being also in section. Fig. 13 is a section on the line 13—13 of Fig. 3. Fig. 14 is a vertical central section on the line 14—14 of Fig. 1.

*General features of the construction.*—There are side frames 10, one on each side of the machine, and each frame has supporting legs, as shown in Fig. 1. These side frames are connected at the front by the cross frame 11 and in the middle by cross-frame 12, and they are also held in place by the shafts 13, 14, 15, 16 and 17 and the reel shaft 18 of the reel 19. Power comes to the machine through the shaft 15 and goes therefrom through pinion 20 to the large gear 21 on shaft 14. Said large gear drives gears 22, 23 and 24, the latter being on the reel shaft for driving the same. On each shaft 13 and 14 there are four sprocket-wheels 25, the sprocket-wheels on the two shafts corresponding with each other longitudinally of the machine, and on each pair of sprocket-wheels there is a sprocket-chain 26 mounted so that the four sprocket-chains in the machine transmit power from shaft 14 to shaft 13.

On the end of shaft 13 there is a cam wheel 27 (see Fig. 3), having in its periphery a cam groove 28 into which a roller 29 projects from one end of a rocking lever 30 fulcrumed between its ends at 31 to a plate 32 secured to a side frame 10. This lever is pivotally connected with the rod 33 that runs to the finger shifting bar 34, which reciprocates transversely of the machine and by pins 35 is pivoted to the fingers 36 and 37 between their ends. These fingers are pivoted at 38 and 39 to a stationary plate 40. A finger 37 shifts a mesh wire 41 from one row of twisters to another, and the lower finger 36 shifts the lower mesh wire 42 from one row of twisters to another, as will hereinafter be explained. These wires are fed into the machine from suitable means and are united with the line wires 43 by twisters, said line wires coming up under pulley 44 from reels not shown, and they pass longitudinally over the twisting mechanism, there being one line wire for each row of twisters, as will be explained hereinafter. The stationary plate 40 is supported on the frame bar 11 by brackets 45.

Most of the foregoing mechanism is of general character, and may be modified so far as the particular features of the invention are concerned.

*Twisting mechanism.*—The sprocket-chain consists of outside links 126 and inside links 226. The outside links have projecting arms 46 to which guide-bars 47 are secured transversely of the machine. There are two series of these guide-bars 47. One series is secured to the three sprocket-chains on the right-hand side of the machine, and the other guide-bars are secured to the three sprocket chains on the left-hand side of the machine, the guide-bars of each series alternating with each other. In the two intermediate chains the middle links 226 also have arms 46 to which the bars 47 are secured, as shown in Fig. 3. The bars 47 which extend to the left-hand side of the machine are secured to the arms 46 on the outside links of the left-hand chain, and to the arms 46 on the middle links in the right-hand intermediate chain, as shown in Fig. 2. On the other hand, the bars 47 which extend to the right are secured to arms 46 on the middle links in the left-hand intermediate chain, and to arms 46 on the outside links of the two right-hand chains.

Twister holding plates 50 are secured on the opposite sides of each guide-bar 47, as seen clearly in Fig. 12. These plates, as shown in Fig. 4, extend only partially across the mesh and the central portion thereof and for substantially the width of the fence or fabric to be made. They have registering vertical notches 51 into which the wires of the fabric enter. The twisting wheels 53 are mounted in and between said plates and they have radial slots registering with the slots in the plates 50. These twister wheels mesh with and are rotated by the rack-bars 55, which extend transversely of the machine and between the plates 50 and slide in a longitudinal groove in the upper edge of each guide-bar 47. They are actuated by the U-shaped plates 57 which are slidably mounted on the guide-bars 47 and are secured to the rack-bars 55, as seen in Fig. 11. A roller 58 is mounted on the lower end of said plate 57 and projects into the guideway 60 or 61. One of these guideways is near each side of the machine, as seen in Figs. 2 and 5, and they are formed by a pair of oppositely located bars 62 which are secured upon the top of plates 63 and on the bottom of plates 64 on the under side of the machine and on the curved end plates 65. As seen in Fig. 4, there is one of each of these two sets of plates near each side of the machine, and they are secured to the intermediate transverse frame member 12, and to the under side thereof respectively. The plates 63 and 64 have on them chain guides 66 overlapping projections from the inside links 126. See Figs. 4 and 8. Said plates 63 support the chains and the twisting arrangement between the front and rear sets of sprocket-wheels 25, so that said twister mechanism will travel horizontally from the front to the rear of the machine.

The guide-ways 60 and 61 reciprocate the two sets of rack-bars simultaneously and in opposite directions. The left-hand guideway 60 actuates the left-hand set of rack-bars, and the right-hand guideway 61 operates the right-hand set of rack-bars. Therefore, the inclined portions of the two guideways 60 and 61 are inclined in opposite directions, as shown in Figs. 2 and 3, and as made clear in Fig. 5. Said Fig. 5 also shows by dotted lines the returning portions of said guideways, which are located on the underside of the machine, and which portions bring the rack-bars back to their starting point and keep them in proper position until after the twisters receive the wires to be twisted. Then the further travel of the twisting mechanism causes the rack-bars to be properly actuated by said guide-bars.

*The transfer of the mesh wires.*—The mesh wire 41 goes through an inclined hole 70 in the finger 37, as seen in Figs. 6 and 7, and also through the eye 71 of said finger. The mesh wire 42 goes through the eye 71 of the lower finger. The cam groove 28 in cam wheel 27 and the lever 30, connecting rod 33 and the bar 34, and the mounting of the fingers 36 and 37 on said bar 34 and plate 40 are such that the limit of movement of said fingers in either direction brings them into alinement with the proper longitudinal rows of twisters and into alinement with the line wires passing through said twisters. Thus as seen in Fig. 3, the arm 36 is in alinement with the first left-hand row of twisters and the arm 37 with the second row of twisters, and therefore hold their respective mesh wires in the position there shown, so that as the twisters travel upwardly the mesh wires will be in position to enter the twisters. Hence the twisters move upwardly to receive the mesh wires, and therefore the arms 36 and 37 have no vertical movement. The cam groove 28 is so arranged that it will bring the inner ends of the fingers into position before the twisters rise to the mesh wires held by the fingers.

As soon as the twisters rise to and receive the mesh wires, then the fingers are oscillated to their other position, as shown in Fig. 7, wherein the left-hand arm 36 has been shifted from the first row of twisters to the second, and the second arm 37 has been shifted from the second row of twisters to the third. In the next operation said arm will be oscillated back to the position shown in Fig. 3. Consequently the left-hand arm 36 oscillates from the first to the second row and back, and the next arm 37 from the second to the third row and back, and the other arms are operated accordingly.

In the machine as herein shown, the arms 36 and 37 are the same length and the pivots 35 are the same distance from the pivots 38 and 39, and the pivots 35 for the two arms are longitudinally the same distance apart as the pivots 38 and 39. This makes the two arms operate alike with equal throw, which is necessary when the line wires of the fabric are equidistant. If, however, the distances between said line wires vary, the extent of throw of the arms must be varied by changing the pivotal points thereof, so that some arms will have greater throw than other arms, and by the two series of arms the mesh wires will be put in two transverse rows of twisters at the same time.

*Forming and removing the fabric.*—When the mesh wires have been inserted in the proper twisters at the front end of the machine, they remain therein until the fabric is woven and are then removed from the twisters, so that the twisters have ample opportunity for twisting the mesh wires around the line wires. This twisting movement occurs while the twisters are passing the outwardly inclined portions of the guideways 60 and 61. These inclinations in the guideways move the rack-bars far enough to cause slightly more than one revolution of the twisters, which effectively unites the mesh wires with the line wires. Said outwardly inclined portions of the line wires are followed by a straight longitudinal section of said guideways, during which the wires are still held in the twisted position by the twisters. Said short longitudinal sections of the guideways are followed by a slight return or inward inclination of the guideways which gives a slight return movement to the rack-bars sufficient to return the twisters, so that their slots will extend upward and release the wires in the twisters. Then the fabric is finished and ready to be removed from the twister mechanism.

The fabric is removed from the twister mechanism while the twisters are still traveling in a horizontal rearward direction, and before they have begun to turn downward at the rear end of the machine. This is accomplished by two rollers 75 and 76 on the shafts 16 and 17, respectively. The fabric is passed under roller 75 and over roller 76 and therefrom to the reel 19. The reel, therefore, draws the fabric through said rollers. The roller 76 is the fabric lifting roller, and it is placed at a considerable distance above the level of the upper part of the twister mechanism and to the rear thereof. The roller 75 is between roller 76 and the horizontal upper portion of the twister mechanism and on a lower level than roller 76. It, therefore, holds the fabric down somewhat so that the rise or elevation of the fabric from the twisting mechanism will be gradual. It is somewhat to the rear, therefore, of the inwardly inclined portions of the guideways 60 and 61 and the point at which the twisters have been righted up, so as to release the fabric. The roller 75 is also located in position to permit the fabric to be lifted entirely away from the twister mechanism before the twisters begin to revolve downward at the rear end of the machine. To enable the reel to perform the function of drawing and winding the fabric as explained, it is frictionally mounted, as is common in the art, for the fabric cannot be drawn away from the twister mechanism any faster than the twister mechanism travels.

The invention claimed is:

1. A machine for making wire fabric including movable means for forming said fabric, and means for causing said fabric-forming means to travel in a straight line along with the movement of the fabric while it is forming the fabric.

2. A machine for making wire fabric including wire twisting mechanism, and means for causing such mechanism to travel in a straight line along with the movement of the fabric during the twisting operation.

3. A machine for making wire fabric including a series of twisters that will receive and unite wires into a fabric, and means for causing said twisters to travel horizontally along with the movement of the fabric during the twisting operation.

4. A machine for making wire fabric including twisters, and endless means on which said twisters are mounted movable longitudinally of the machine and in the same plane while the fabric is being formed.

5. A machine for making wire fabric including twisters for forming the fabric, endless means for carrying said twisters which travels for some distance in a straight line, and means for operating the twisters while they are traveling in a straight line.

6. A machine for making wire fabric including a pair of rotary members spaced from each other, endless means mounted on and caused to travel by said members so that said means will travel in a straight line from one of said members to the other, twisters mounted on said endless means and means for causing the operation of said twisters while traveling from one of said members toward the other.

7. A machine for making wire fabric including a pair of members spaced from each other and in the same horizontal plane, endless means mounted on and caused to travel by said members so that said means will travel horizontally from one of said members to the other, twisters mounted on said endless means, and means for causing the operation of said twisters while traveling horizontally.

8. A machine for making wire fabric including a pair of shafts, sprocket-wheels on said shafts, sprocket-chains mounted on the corresponding sprocket-wheels of the two shafts, twister mechanism carried by said chains, and means for operating said twister mechanism while the twisters are traveling from one set of sprocket-wheels toward the other set of sprocket-wheels for making the fabric.

9. A machine for making wire fabric including means for forming said fabric, means for causing said fabric-forming means to travel in a straight line while it is forming the fabric, and means out of alinement with said fabric-forming means for removing the fabric by moving it out of alinement with the fabric-forming means.

10. A machine for making wire fabric including wire twisting mechanism, means for causing such mechanism to travel in a straight line during the twisting operation, and means for removing the fabric from the twisting mechanism by moving the fabric out of alinement with the twisting mechanism.

11. A machine for making wire fabric including a series of twisters that will receive and unite wires into fabric, means for causing said twisters to travel horizontally during the twisting operation, and a roller over which the fabric passes after it has been made, said roller arranged so as to lift the fabric free from the twisters while they are traveling horizontally.

12. A machine for making wire fabric including a series of slotted twisters that will receive and unite wires into a fabric, means for causing said twisters to travel horizontally during the twisting operation, a roller over which the fabric passes after it has been made and the said roller arranged so as to lift the fabric out of the twisters while they are traveling horizontally, and a reel for drawing the fabric over said roller from the twisting mechanism.

13. A machine for making wire fabric including a series of twisters that will receive and unite wires into a fabric, means for causing said twisters to travel horizontally during the twisting operation, a roller mounted on a higher level than the twister mechanism and to the rear thereof over which the fabric passes, a reel for drawing the fabric over said roller, and another roller in front of said first-mentioned roller and on a lower level for holding the fabric down so it will gradually be lifted out of the twisters while they are traveling horizontally.

14. A machine for making wire fabric including an endless series of slotted twisters, a plurality of rotary means over which said series of twisters travel so that they travel in a straight line from one of said rotary means to another, and means in front of the series of twisters for placing the wires in position to enter the twisters as they approach their straight line of travel.

15. A machine for making wire fabric including an endless series of slotted twisters, a plurality of rotary means over which said series of twisters travel so that they travel horizontally from the front toward the rear of the machine, means in front of the series of twisters for placing the wires in position to enter the twisters as they move upward toward their horizontal line of movement, and means for lifting the fabric from said twisters near the rear end of their horizontal movement.

16. A machine for making wire fabric including twister mechanism that will travel along with the fabric horizontally, means for supporting said twister mechanism in such movement, and means for operating the twister mechanism while thus traveling.

17. A machine for making wire fabric including an endless twister mechanism, a plurality of rotary members spaced apart over which said twister mechanism operates, means between said rotary members for supporting the twister mechanism while traveling from one rotary member to the other rotary member, and means for operating the twister mechanism while traveling from one rotary member to the other rotary member.

18. A machine for making wire fabric including an endless twister mechanism, a plurality of rotary means in the same horizontal plane on which said twister mechanism is mounted and actuated so that it travels horizontally from one rotary means to the other rotary means, fixed means over which said twister mechanism travels from one rotary member to the other rotary member for maintaining it in horizontal position, and means for operating the twister mechanism during such horizontal movement.

19. A machine for making wire fabric including a pair of shafts in the same horizontal plane, sprocket-wheels thereon, sprocket-chains on said sprocket-wheels, rigid means between the sprocket-wheels on the two shafts for supporting the sprocket-chains while traveling from one set of sprocket-wheels to the other set of sprocket-wheels, twister mechanism carried by said sprocket-chains, and means for operating the twister mechanism while traveling from one set of sprocket-wheels to the other set of sprocket-wheels.

20. A machine for making wire fabric including an endless twister mechanism, a portion of which travels horizontally from the front to the rear of the machine, a horizontal plate over which said twister mechanism travels, and means on said plate for causing the operation of the twisters during their horizontal travel.

21. A machine for making wire fabric including slotted twisters, movable means for carrying said twisters in transverse and longitudinal rows, a rack-bar for operating each transverse row of twisters, and means for actuating every alternate rack-bar in one direction and at the same time actuating the remaining rack-bars in the opposite direction.

22. A machine for making wire fabric including slotted twisters, endless means on which said twisters are mounted in transverse and longitudinal rows, said endless means adapted to travel for some distance horizontally, a plate over which said twister carrying means travels horizontally, a rack-bar for operating each transverse row of twisters, and means on said plate for actuating said rack-bars as they travel from the front toward the rear of the machine.

23. A machine for making wire fabric including slotted twisters, endless means on which said twisters are mounted in transverse and longitudinal rows, said endless means adapted to travel for some distance horizontally, a plate over which said twister carrying means travels horizontally, a rack-bar for operating each transverse row of twisters, rollers extending downward from the ends of the rack-bars, and guideways on said plate along which said rollers travel as the twister carrying means travels from the front toward the rear of the machine, whereby said rack-bars will be actuated.

24. A machine for making wire fabric including slotted twisters, endless means traveling from the front toward the rear of the machine on which said twisters are mounted in transverse and longitudinal rows, a rack-bar for operating each transverse row of twisters, means at one side of said twister-carrying means for actuating every alternate rack-bar, and means at the other side of the twister-carrying means for simultaneously actuating the remaining rack-bars.

25. A machine for making wire fabric including slotted twisters, endless means traveling from the front toward the rear of the machine on which said twisters are mounted in transverse and longitudinal rows, a rack-bar for operating each transverse row of twisters, a plate over which each lateral portion of the twister-carrying means travels, a downward extension from the ends of said rack-bars, and a guideway in said plate which receives said extension from the rack-bar, there being one guideway at each side of the twister-carrying means and each guideway receiving the extensions from the alternate rack-bars so that one guideway will actuate each alternate rack-bar and the other guideway will actuate the remaining rack-bars.

26. A machine for making wire fabric including a pair of endless chains traveling from the front toward the rear of the machine, transverse guide-bars secured to the links of said chains and having longitudinal guide-slots in their upper edges, rack-bars with their lower edges fitting in said guide-slots and slidable therein transversely of the machine, means secured to the end of each rack-bar and slidable on said guide-bar for actuating the rack-bar, twisters, and a plate secured to each side of said guide-bar in which said twisters are mounted and held in engagement with the rack-bar, substantially as set forth.

27. A machine for making wire fabric including four endless sprocket chains movable from the front toward the rear of the machine, arms extending up from the links of said sprocket-chains, two series of guide-bars secured to the arms on the links of said chains, one series consisting of every alternate rack-bar being secured to the links on the three left-hand chains and every other rack-bar being secured to the links on the three right-hand chains, a rack-bar mounted on each guide-bar so as to be slidable transversely of the machine, a plate secured to each side of each rack-bar, twisters mounted in each pair of plates so as to mesh with the rack-bar between said plates, downwardly extending means from the outer end of each rack-bar, a plate under the outer ends of each series of rack-bars, and guideways on said plates in position to receive the downward extension from each series of rack-bars and arranged so as to simultaneously actuate the adjacent rack-bars in opposite directions.

28. A machine for making wire fabric including twisters, endless means for carrying said twisters, means for causing the travel of said means in a straight line, transverse rack-bars for actuating said twisters, and endless means for controlling and operating said rack-bars.

29. A machine for making wire fabric including twisters, endless means for carrying said twisters, transverse rack-bars for actuating the twisters, endless plates about which said twister-carrying means moves, and endless guideways on said plates for actuating and controlling the operation of the rack-bars.

30. A machine for making wire fabric including a pair of shafts, sprocket-wheels on each of said shafts, chains carried by said sprocket-wheels and movable longitudinally of the machine, twisters mounted on said chains, transverse rack-bars for actuating said twisters, endless plates surrounding said two shafts and about which the twisters and rack-bars are moved, and endless guideways on said plates for controlling and actuating the guide-bars.

31. A machine for making wire fabric including a plurality of parallel endless chains, transverse bars secured to said chains, rack-bars slidably mounted in connection with said cross-bars, twister wheels carried by said cross-bars and actuated by said rack-bars, stationary plates over which said chains move, chain guides secured to said plates and overlapping the inner edges of the inner two chains for holding the chains and twister mechanism in place during the movement thereof, and guideways on said plate for actuating and controlling the rack-bars.

32. A machine for making wire fabric including twisters arranged in transverse and longitudinal rows, means for conveying said twisters from the front toward the rear of the machine, a stationary cross-plate at the front end of the machine, two series of fingers of equal length and pivoted to said plate at such points that the inner ends of the two series of fingers will hold the mesh wires in position to enter two transverse rows of twisters simultaneously, and a transversely movable bar pivoted to said two series of fingers at such points as to give to the inner ends of said two series of fingers the desired throw.

33. A machine for making wire fabric, including twisters arranged in transverse and longitudinal rows, means for conveying said twisters from the front toward the rear of the machine, a stationary cross-plate at the front end of the machine, two series of fingers of equal length and pivoted to said plate at such points that the inner ends of the two series of fingers will hold the mesh wires in position to enter two transverse rows of twisters simultaneously, and a transversely movable bar pivoted to said two series of fingers at such points as to give to the inner ends of said two series of fingers an equal throw.

In witness whereof, I have hereunto affixed my signature.

JOHN W. DWIGGINS.